United States Patent [19]

Butcher

[11] 4,394,703
[45] Jul. 19, 1983

[54] LOAD PROTECTING ARRANGEMENT

[75] Inventor: James S. Butcher, Glendale Heights, Ill.

[73] Assignee: GTE Automatic Electric Labs Inc., Northlake, Ill.

[21] Appl. No.: 334,188

[22] Filed: Dec. 24, 1981

[51] Int. Cl.³ .............................................. H02H 3/08
[52] U.S. Cl. .................................. 361/101; 330/207 P
[58] Field of Search ...................... 361/18, 74, 79, 86, 361/87, 98, 100, 101; 330/207 P, 298

[56] References Cited

U.S. PATENT DOCUMENTS 3,573,553 4/1971 Mietz ..................................... 361/74
3,786,364 1/1974 Wheatley, Jr. ...................... 330/298
4,270,159 5/1981 Buckle ........................... 330/207 P X

FOREIGN PATENT DOCUMENTS 1809570 6/1969 Fed. Rep. of Germany ...... 361/101

OTHER PUBLICATIONS

"Sensing Resistor Limits Power-Supply Current", -Smit *Electronics*, vol. 48, No. 25, p. 107, 12/75.

*Primary Examiner*—Harry E. Moose, Jr.
*Attorney, Agent, or Firm*—Robert J. Black; Charles A. Doktycz

[57] ABSTRACT

A protecting arrangement is dislcosed for multiple loads supplied from a single DC power source. Each load is monitored by a separate protection circuit. Detection of an over-current condition associated with one of the loads will cause the associated protection circuit to assume a non-conducting state and provide a visual indication of same. Periodically enabled common reset means are provided to restore conduction to non-conducting protection circuits following removal of the cause of over-current.

17 Claims, 1 Drawing Figure

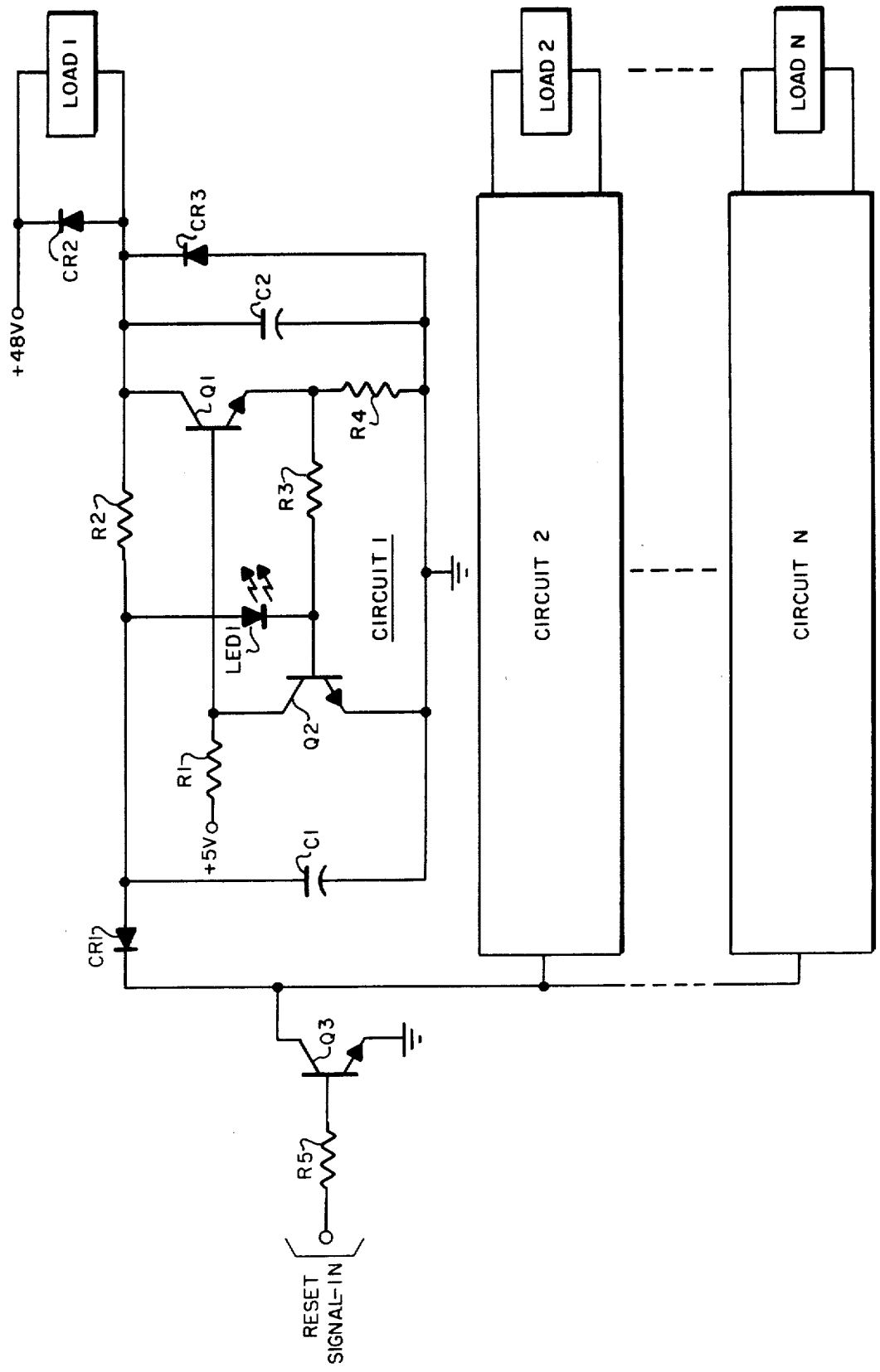

LOAD PROTECTING ARRANGEMENT

BACKGROUND OF THE INVENTION (1) Field of the Invention

The present invention relates in general to key telephone systems, and more particularly to protection of electronic key telephone system station instruments.

(2) Description of the Prior Art

Key telephone systems are well known in the art. When placing or receiving a call in such systems, the subscriber station instrument is normally connected to the central office or telephone exchange by means of two metallic conductors (transmission leads) arranged to form a subscribers loop. Such a loop includes battery power through a conventional battery feed relay or similar electronic device to energize the station instrument as well as the ability to carry audio signals in both directions. Protection against shorts in the subscriber loop is provided in such a system by the battery feed relay or electronic device.

Methods similar to those employed in the central office are used to supply power to key telephone stations when interstation communication, sometimes known as intercom service, is provided in a key system. Such a system is described in U.S. Pat. No. 4,010,332 issued Mar. 1, 1977, to Coy Edwin Matheny. This patent describes a method of supplying power to a key telephone system station over two transmission leads from a power source through line balancing apparatus, and a loop protecting series regulator. This is a generally satisfactory method of protection when the protected station has a very low power requirement.

Recently microprocessors have been incorporated into key telephone stations to implement new features. These microprocessor equipped key telephone stations require substantially greater amounts of power then previous types of key system station instruments, thus making protection by the above means impractical due to the large and expensive heat sinking which would be required for the pass elements used.

Another method of providing protection against over-current conditions while requiring less heat sinking of a pass element such as a power transistor is through the use of foldback current limiting as taught in U.S. Pat. No. 3,940,572 issued Feb. 24, 1976, to Robert L. Burgess. This method requires less heat sinking of the transistor than the straight constant current limiting technique above because the short circuit output current is reduced to a fraction of the full load output current. This method however, is undesirable when used with key telephone station instruments containing a microprocessor, because this type of protection circuit, once tripped by an over-current condition, generally requires momentary disconnection of the station to restore station power.

Yet another method of powering a key telephone station instrument while protecting against over-current fault conditions may be realized through use of the circuit described in "Circuits For Engineers," edited by Samuel Weber (page 311). This circuit does not suffer from the limitations cited above in that, upon detecting of an over-current condition the circuit switches its pass transistor completely off thereby eliminating power dissipation through the transistor and thus the need for pass transistor heat sinking. Further, this circuit includes means to delay circuit turnoff on initial detection of an overload condition thereby preventing circuit turnoff by momentary over-current conditions. This design however is undesirable in that, circuit reset may be achieved only by momentarily disconnecting the load or disabling the circuit by means of its input lead. When connected in a multiple protection circuit and load arrangement driven by a common reset signal as is done in the present invention, this circuit reset technique would undesirably cause all protection circuits, whether overloaded or not, to turn off momentarily.

Accordingly it is the object of the present invention to provide a new and improved load protecting arrangement that overcomes the above noted objections.

SUMMARY OF THE INVENTION

The present invention consists of a protection circuit located between a source of 48 volt DC power and a power consuming key telephone system station instrument. The protection circuit contains a pass transistor and current sense resistor serially connected in the power supply ground return path. A resistor is located between a DC bias supply and the pass transistor, and conditions the latter to permit current flow. A control transistor is connected between ground and the pass transistor, and includes a control input connected to the current sense resistor.

A feedback circuit containing a resistor and diode in series is provided between the pass transistor and control transistor input. Finally, the present invention includes a reset circuit consisting of a transistor connected between ground and the feedback circuit through a diode, and a resistor in series with the transistor's input.

The present invention operates to supply power to each station of a key telephone system through an associated protection circuit. Current through the bias resistor, pass transistor, and sense resistor saturate the transistor permitting current to flow through it thereby powering the load. The flow of load current through the sense resistor, causes a signal to be developed which will, if sufficiently small, not be sensed by the control transistor thereby allowing the protection circuit to remain conductive. If however, the control transistor senses the developed signal, as when load current increases beyond a predetermined level during an overload, it will partially turn on and sink some of the pass transistor's bias current. As a result, the pass transistor will come out of saturation and limit the load current causing a signal to be developed in the feedback path. The feedback path signal will aid the load current developed signal sensed by the control transistor turning the transistor completely on thereby sinking all bias current to ground. With no bias current provided it, the pass transistor will switch-off stopping the flow of current through the load.

Reset pulses are distributed to each protection circuit via isolation diodes from a source of periodically occurring very low duty cycle (on-to-off ratio) pulses. The pulses attempt to reset the protection circuits which have been overloaded, but do not affect the other circuits. As the reset pulse commences it will turn on the reset circuit transistor, sinking all feedback path developed signals of overloaded protection circuits, and permitting those circuits to once again conduct and sense load current as described above. If the current sensed is greater than a predetermined value, the protection circuit will function as a current-limited source until the "on" portion of the reset pulse ends; at which time, the protection circuit will reassume its "switched-off" state.

If the current sensed is less than the predetermined value, the protection circuit will assume a fully conducting state and not switch off when the reset pulse ends.

A light emitting diode included in the protection circuit provides a visual indication of the protection circuit's state. That is, the light emitting diode will light to indicate a protection circuit which has "switched-off" due to an overload, being dark otherwise.

BRIEF DESCRIPTION OF THE DRAWING

The accompanying drawing depicts a schematic circuit diagram of the preferred embodiment of Applicant's invention.

DESCRIPTION OF THE PREFERRED EMBODIMENT

Referring now to the drawing in which are shown multiple loads labeled LOAD 1 through LOAD N each connected via a first conductor to a common source of 48 volt DC power. Ground is separately provided to the loads via a second conductor of each through respective protection circuits.

The first protection circuit has been detailed in the drawing and should be understood to represent CIRCUIT 1, protection circuits 2 through N being circuit-wise similar and represented by boxes labeled CIRCUIT 2 through CIRCUIT N respectively.

Referring now to the CIRCUIT 1 portion of the drawing showing the second lead of LOAD 1 connected to the collector of pass transistor Q1. Pass transistor Q1 also has its emitter connected to ground through current sense resistor R4, and its base connected to a common ground referenced 5 volt bias power supply (not shown) through bias resistor R1. Control transistor Q2 has its collector connected to the base of pass transistor Q1, its base connected to the ungrounded end of current sense resistor R4, and its emitter connected to ground.

Resistor R2 is connected to the collector of pass transistor Q1 via a first end and to the cathode of light emitting diode LED 1 via a second end. Light emitting diode LED 1's anode is connected to the base of control transistor Q2. Capacitor C1 has a first end connected to ground, and a second end connected to the common point of resistor R2 and light emitting diode LED 1. Diode CR1 has its anode connected to the ungrounded end of capacitor C1, its cathode being connected as indicated below.

Capacitor C2 has a first end connected to ground and a second end connected to the collector of pass transistor Q1. Diode CR2 is connected to the 48 V DC power source through its cathode and to the collector of pass transistor Q1 through its anode. Diode CR3 has its cathode connected to the collector to pass transistor Q1 and its anode connected to ground.

Referring now to the entire drawing of the present invention, a reset signal distribution circuit is provided to distribute reset pulses of approximately three percent duty cycle from a source (not shown) to each protection circuit. The reset distribution circuit consist of transistor Q3 and resistor R5 arranged with transistor Q3's emitter connected to ground, its collector connected to the cathodes of each protection circuit's CR1 diode, and its base connected to a first end of a resistor R5. The second end of resistor R5 is connected to the above mentioned source of low duty cycle pulses.

Referring again to CIRCUIT 1 of the drawing, operation of the protection circuit will be described. Protection CIRCUIT 1 is normally conditioned to conduct current. To permit this, pass transistor Q1 is biased in the conducting mode by means of a common 5 volt DC bias supply (not shown) creating a current flow from terminal +5 V through resistor R1, the base-emitter junction of transistor Q1, current pass resistor R4, to ground. CIRCUIT 1 monitors current passing through LOAD 1 by directing the current through pass transistor Q1 and current sense resistor R4. As increased current is drawn by LOAD 1, an increased potential across resistor R4 is sensed by control transistor Q2 through isolation resistor R3.

Protection circuit current limiting will occur when load current exceeds a predetermined value, 300 milliamps by way of example, at which point the signal developed across resistor R4 reaches a sufficiently high level, to turn on control transistor Q2. As control transistor Q2 begins conducting, it will shunt some of transistor Q1's bias current causing pass transistor Q1 to come out of saturation and limit the current passed by it to a predetermined value. As pass transistor Q1 comes out of saturation its collector voltage rises resulting in a flow of current from transistor Q1's collector through a feedback path consisting of resistor R2 and light emitting diode LED 1 in series to ground through the base-emitter junction of control transistor Q2. The feedback path developed signal aides the signal developed across current sense resistor R4 in turning on control transistor Q1 which further decreases the bias of pass transistor Q1 turning pass transistor Q1 completely off thereby removing power from LOAD 1. Components of the feedback and the current sense paths are selected such that, as pass transistor Q1 turns off, the rate at which a signal is developed in the feedback path is greater than the rate at which the current sense signal across resistor R4 drops off.

Capacitor C1 delays development of feedback path signals to prevent acceptable momentary over-current conditions from switching off the protection circuit. Capacitor C2 prevents high frequency oscillation as CIRCUIT 1 limits and turns off completely as described above. Diodes CR2 and CR3 limit load induced voltages to those voltages between the 48 volt DC power source and ground.

When in a protecting or "switched-off" state due to a previous overload, CIRCUIT 1 will receive power-up-reset pulses from a reset signal source (not shown) through the reset signal distribution circuit, which is common to all protection circuits, and diode CR1, common only to CIRCUIT 1. The power-up-reset pulse, upon its occurrence, will disable the feedback signal of CIRCUIT 1 permitting control transistor Q2 to turn off thus allowing current pass transistor Q1 to be biased into conduction by its bias supply. CIRCUIT 1 will then operate in a current-limiting mode as described above for the duration of the reset pulse if an over-current condition still exists. If LOAD 1 determines circuit current, insufficient signal will be sensed by control transistor Q2 across sense resistor R4. Control transistor Q2 will thus remain off permitting pass transistor Q1 to saturate preventing a signal in the feedback path from being developed. No change will therefore occur when the reset pulse ends and the protection circuit will remain in the conducting mode.

It will be obvious to those skilled in the art that numerous modifications of the present invention can be made without departing from the spirit of the invention which shall be limited only by the scope of the claims appended hereto.

What is claimed is:

1. A protection circuit for use between a first source of DC power and a load, comprising:

current pass means connected between said load and said DC source;

DC bias means connected to said current pass means, conditioning said current pass means to conduct therethrough, current from said first DC power source to said load;

sensing means connected to said current pass means;

control means connected to said sensing means and to said current pass means, initially operated in response to detection of a flow of current in excess of a predetermined value, from said first source to said load by said sensing means, to operate said current pass means to limit the flow of current therethrough;

feedback means connected between said current pass means and said control means, developing a signal in response to said limiting of current flow through said current pass means, to render said control means fully operated, and render said current pass means inoperative;

and reset means operated in response to said rendering of said current pass means inoperative, to disable said feedback means developed signal to thereby render said current pass means reoperated.

2. A protection circuit as claimed in claim 1 wherein: said current pass means is a bipolar transistor.

3. A protection circuit as claimed in claim 1 wherein: said control means is a bipolar transistor.

4. A protection circuit as claimed in claim 1 wherein: said feedback means comprises a resistor and a diode connected in series.

5. A protection circuit as claimed in claim 4 wherein: said diode is a light emitting diode providing a visual indication of the state of said current pass means.

6. A protection circuit as claimed in claim 1 wherein: said sensing means further includes isolation means functioning to direct the signal developed by said feedback means to said control means.

7. A protection circuit as claimed in claim 6 wherein: said isolation means comprises a resistor.

8. A protection circuit as claimed in claim 1 wherein: timing means is provided connected to said feedback means, and operated to delay said signal developed by said feedback means, for at least a minimum predetermined time before rendering said current pass means inoperative.

9. A protection circuit as claimed in claim 8 wherein: said timing means is a capacitor.

10. A protection circuit as claimed in claim 1 wherein: said bias means is a second DC power source.

11. A protection circuit as claimed in claim 1 wherein: said reset means is a bipolar transistor.

12. A protection circuit for use between a first source of DC power and a load, comprising:

current pass means connected between said load and said DC source;

DC bias means connected to said current pass means, conditioning said current pass means to conduct therethrough, current from said first DC power source to said load;

sensing means connected to said current pass means;

control means connected to said sensing means and to said current pass means, initially operated in response to detection of a flow of current in excess of a predetermined value, from said first source to said load by said sensing means, to operate said current pass means to limit the flow of current therethrough; and feedback means including a light emitting diode connected between said current pass means and said control means, developing a signal in response to said limiting of current flow through said current pass means, to render said control means fully operated, and thereby render said current pass means inoperative, said light emitting diode operated in response to said feedback means developed signal to give a visual indication of said pass means inoperative condition.

13. A load protecting arrangement for use with a first DC power source and a plurality of loads, including periodically enabled reset means, and a plurality of protection circuits, each connected between said first source and an associated one of said loads and each comprising:

current pass means connected between said load and said DC source;

DC bias means connected to said current pass means, conditioning said current pass means to conduct therethrough, current from said first DC power source to said load;

sensing means connected to said current pass means;

control means connected to said sensing means and to said current pass means, initially operated in response to detection of a flow of current in excess of a predetermined value, from said first source to said load by said sensing means, to operate said current pass means to limit the flow of current therethrough;

feedback means connected between said current pass means and said control means, developing a signal in response to said limiting occurred flow through said current pass means, to render said control means fully operated, and thereby render said current pass means inoperative;

and signal blocking means connecting said feedback means to said reset means, operated to conduct said feedback means developed signal to said reset means but block signals from any other ones of said protection circuits;

said enabled reset means operated, in response to said rendering of at least one of said current pass means inoperative, to disable said associated control means and thereby render said current pass means reoperated.

14. An arrangement as claimed in claim 13 wherein: said reset means is a bipolar transistor connected to a source of periodic pulses and said signal blocking means comprises a diode.

15. An arrangement as claimed in claim 13 wherein: said sensing means further includes isolation means, functioning to direct the signal developed by said feedback means to said control means; and timing means connected to said feedback means, operated to delay said signal developed by said feedback means for at least a minimum predetermined time before rendering said current pass means inoperative.

16. An arrangement as claimed in claim 15 wherein: said isolation means comprises a resistor and said timing means comprises a capacitor.

* * * * *